United States Patent [19]

Engelhardt et al.

[11] Patent Number: 4,743,666
[45] Date of Patent: May 10, 1988

[54] WATER-SOLUBLE COPOLYMERS WITH PENDANT PHOSPHONIC, SULPHONIC AND AMIDE GROUPS

[75] Inventors: Friedrich Engelhardt, Frankfurt; Klaus Kühlein, Kelkheim; Juliane Balzer, Frankfurt; Walter Dürsch, Königstein; Hans-Jerg Kleiner, Kronberg, all of Fed. Rep. of Germany

[73] Assignee: Cassella Aktiengesellschaft, Leverkusen am Main, Fed. Rep. of Germany

[21] Appl. No.: 885,208

[22] Filed: Jul. 14, 1986

Related U.S. Application Data

[63] Continuation of Ser. No. 754,354, Jul. 11, 1985, abandoned, which is a continuation of Ser. No. 554,898, Nov. 25, 1983, abandoned.

[30] Foreign Application Priority Data

Dec. 9, 1982 [DE] Fed. Rep. of Germany ....... 3245541
Dec. 24, 1982 [DE] Fed. Rep. of Germany ....... 3248031

[51] Int. Cl.$^4$ .............................................. C08F 230/02
[52] U.S. Cl. .................................. 526/240; 8/94.1 R; 8/553; 8/557; 526/264; 526/278
[58] Field of Search ................. 526/240, 278

[56] References Cited

U.S. PATENT DOCUMENTS

| | | | |
|---|---|---|---|
| 3,297,663 | 1/1967 | Herbst | 526/278 |
| 4,309,523 | 1/1982 | Engelhardt et al. | 526/240 |
| 4,357,245 | 11/1982 | Engelhardt et al. | 252/8 C |
| 4,451,631 | 5/1984 | Engelhardt et al. | 526/287 |
| 4,521,579 | 6/1985 | Engelhardt et al. | 526/287 |

Primary Examiner—Christopher Henderson
Attorney, Agent, or Firm—Connolly & Hutz

[57] ABSTRACT

Water-soluble copolymers containing a statistical distribution of 1–86% by weight of structural units of the formula $$-CH_2-CH- \atop \underset{O^\ominus X^\oplus}{\overset{O=P-OR^1}{|}}$$

9–80% by weight of units of the formula $$-CH_2-CH- \atop Y-SO_3^\ominus X^\oplus$$

5–90% by weight of units of the formula $$-CH_2-\underset{\underset{NH_2}{|}}{\overset{R^2}{\underset{|}{\overset{|}{C}H-}}}{\overset{|}{\underset{C=O}{|}}}$$

and up to a total of 30% by weight of one or more units of the formulae $$-CH_2-CH- \atop \underset{CO-R^4}{\overset{|}{N-R^3}} \,,\, -CH_2-CH- \atop \underset{O}{\overset{\oplus X^\ominus O-P-O^\ominus X^\oplus}{\overset{|}{\underset{\|}{|}}}} \text{ and } -CH_2-\underset{COO^\ominus X^\oplus}{\overset{R^5}{\underset{|}{\overset{|}{C}-}}}$$

wherein
$R^1$ is alkyl having 1 to 4 carbon atoms;
$R^2$ and $R^5$ independently of one another are each hydrogen or methyl;
$R^3$ and $R^4$ independently of one another are each hydrogen, methyl or ethyl, or together $R^3$ and $R^4$ are trimethylene or pentamethylene;
Y is a direct bond, phenylene or a moiety of the formula $-CO-NH-C(CH_3)_2-CH_2-$;
$X^\oplus$ is $H^\oplus$ or a cation;
and said copolymers are useful as dyestuff auxiliaries and leather retanning agents.

3 Claims, No Drawings

WATER-SOLUBLE COPOLYMERS WITH PENDANT PHOSPHONIC, SULPHONIC AND AMIDE GROUPS

This is a continuation of application Ser. No. 754,354 filed July 11, 1985, abandoned, which in turn is a continuation of application Ser. No. 554,898 filed Nov. 25, 1983, abandoned.

The present invention relates to new water-soluble copolymers containing, in a statistical distribution, 1–86% by weight of radicals of the formula I

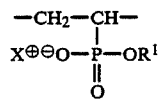

9–80% by weight of radicals of the formula II

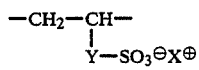

5–90% by weight of radicals of the formula III

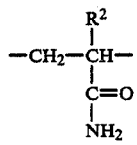

and, if appropriate, 0 to a total of 30% by weight of radicals of the formulae

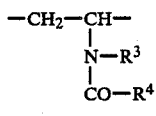

and/or

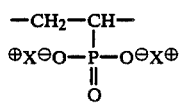

and/or

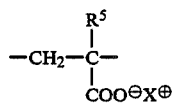

In the formulae I to VI, $R^1$ denotes alkyl having 1 to 4, preferably 1 or 2, C atoms; $R^2$ and $R^5$, independently of one another, denote hydrogen or methyl; $R^3$ and $R^4$, independently of one another, denote hydrogen, methyl or ethyl, or together represent trimethylene or pentamethylene, Y represents a direct bond, phenylene or a group of the formula $-CO-NH-C(CH_3)_2-CH_2-$ and $X^\oplus$ represents a proton ($H^+$) or a cation.

The invention also relates to the preparation of these new copolymers and to their use as auxiliaries in textile dyeing and as re-tanning substances.

In principle, the cation $X^\oplus$ can be derived from any known water-soluble base which is strong enough to neutralise the sulphonic and phosphonic acid groups of the copolymers to be employed in accordance with the invention and which does not impair the solubility in water of the copolymers. The choice can thus be made in a simple and known manner.

However, it is advantageous for $X^\oplus$ to denote an alkaline earth metal or preferably an alkali metal cation, in particular a sodium or potassium cation, an ammonium ion or a cation derived from lower aliphatic amines. Lower aliphatic amines from which the cations $X^\oplus$ can be derived are primary, secondary or tertiary, and contain, if appropriate, alkyl groups which have 1 to 4 C atoms and are substituted by —OH groups. Preferred amines are those which contain at least 1 β-hydroxyethyl radical, such as β-aminoethanol, β-dimethylaminoethanol, bis-(β-hydroxyethyl)-methylamine, tris-(β-hydroxyethyl)amine, diethyl-β-hydroxyethylamine or bis-(β-hydroxyethyl)-ethylamine.

Preferred copolymers according to the invention consist of a statistical distribution of 1–10% by weight of radicals of the formula I, 10–70% by weight of radicals of the formula II, 29–80% by weight of radicals of the formula III and 0–20% by weight of radicals of the formulae IV, V and/or VI.

Copolymers which can be employed particularly preferentially contain radicals of the formula II in which Y denotes the radical $-CO-NH-C(CH_3)_2-CH_2-$.

The molecules of the copolymers according to the invention can, of course, also contain several different individuals which are drawn from each of the structural groups defined by the general formulae I to IV and VI and which differ in the meanings of the symbols Y or $R^1$ to $R^5$.

Thus they can contain in the same polymer molecule, for example, either AIBA or vinylsulphonic acid structural units or open-chain as well as cyclic vinylamide structural units of the formula IV or vinylphosphonic acid esters having different alkyl radicals $R^1$ of varying chain length. As a rule, the copolymers according to the invention contain not more than 3, preferably not more than 2, different structural units drawn from each of the individual groups of the general formulae I to IV and VI.

The preparation of water-soluble polymers containing sulphonic acid groups incorporated into the macromolecule has already been described in detail in numerous patents and in the specialist literature. Thus, for example, the synthesis of copolymers of vinylsulphonic acid with acrylamide and vinylpyrrolidone has been published in J. Polymer Sci., 38 147 (1959).

A process for the preparation of water-soluble copolymers formed from vinylsulphonic acid and acrylonitrile or methacrylonitrile, if appropriate mixed with further ethylenically unsaturated compounds, has been described in German Pat. No. 1,101,760 (corresponding to U.S. Pat. No. 3,164,574). Copolymers formed from vinylsulphonates and/or alkylsulphonates with acrylamide and vinylamides have been described, for example, in German Auslegeschrift No. 2,444,108 (corresponding to U.S. Pat. No. 4,048,077).

Water-soluble copolymers containing, as the comonomer, 2-acrylamido-2-methylpropane-3-sulphonic acid, abbreviated to AIBA in the following text, have been described in U.S. Pat. Nos. 3,953,342, 3,768,565, 3,907,927, 3,926,718 and in German Offenlegungsschriften Nos. 2,502,012 and 2,547,773.

Insofar as they contain copolymerised comonomers of the formula IV in which $R^3$ and $R^4$ together denote trimethylene or pentamethylene, the copolymers according to the invention can be prepared in the manner known from the state of the art, for example in accordance with the instructions of U.S. Pat. No. 3,929,741, by reacting the monomers at temperatures of about 10° to 120° C., preferably at 40° to 80° C., in the presence of suitable polymerisation catalysts. It is not necessary in this process to neutralise the acid groups prior to polymerisation, and the copolymers according to the invention, in which $X^\oplus$ is a proton, are obtained without further treatment.

If it is intended to carry out, under analogous conditions, the copolymerisation of AIBA, styrene sulphonic acid or vinyl sulphonic acid with non-cyclic N-vinylamides, that is to say those of the general formula

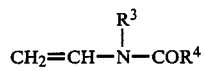

in which $R^3$ and $R^4$ do not together denote trimethylene or pentamethylene, it is necessary to convert the acid components into their salts with the cation $X^\oplus$ prior to the polymerisation by adding bases.

The bases which are advantageously employed in this connection are the hydroxides of the cations $X^\oplus$ or the salts thereof with weak acids, such as carbonic acid or phosphoric acid, or, in the case of amine bases, $NH_3$ or the free amines.

Neutralisation of the acid components prior to the polymerisation is, however, also possible, and even advantageous, as a rule, in the copolymerisation of cyclic compounds. Therefore, for the preparation of each 100 parts by weight of the copolymer, it is advantageous to dissolve, in water or in a water/alkanol mixture in which the finished copolymer, is also still soluble, or in a wate miscible organic solvent, 1–86% by weight of an ester of the formula Ia

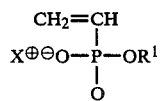

9–80 parts by weight of an olefinically unsaturated sulphonic acid of the formula IIa: $CH_2=CH-Y-SO_3H$, and, if appropriate, 0 to 30 parts by weight of methacrylic and/or acrylic acid and/or vinylphosphonic acid, to neutralise the acid groups by adding a base, of necessity in the event that $R^3$ and $R^4$ do not together denote trimethylene or pentamethylene or optionally in the event that $R^3$ and $R^4$ together denote trimethylene or pentamethylene, and then to add 0 to 30 parts by weight of a vinylacylamine of the formula IVa

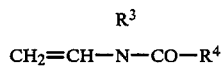

wherein $R^3$ and $R^4$ are identical or different and independently of one another denote hydrogen, methyl or ethyl or together denote trimethylene or pentamethylene, and 5 to 90 parts by weight of acrylamide and/or methacrylamide, and to initiate the copolymerisation and to carry it out at 10° to 120° C. in a manner which is in itself known. If the copolymerisation has been carried out after neutralisation, copolymers according to the invention, in which $X^\oplus$ is a proton, are obtained by the acid groups of the copolymer being liberated in a manner which is in itself known as the result of adding equivalent amounts of sufficiently strong acids, preferably inorganic acids.

Preferred copolymers according to the invention are obtained if 1–10 parts by weight of the vinylphosphonic acid ester of the formula Ia, 10–70 parts by weight of the unsaturated sulphonic acid of the formula IIa, 29–80 parts by weight of acrylamide and/or methacrylamide and 0–20 parts by weight of the vinylacylamine of the formula IVa and/or vinylphosphonic acid and/or acrylic acid and/or methacrylic acid are employed for the preparation of each 100 parts by weight of the copolymer.

The polymerisation can be carried out as solution polymerisation, as precipitation polymerisation or in an inverted emulsion.

If water or a water/alkanol mixture is used as the solvent, a water-miscible alkanol having 1 to 4 C atoms being employed and the finished copolymer being soluble in the water/alkanol mixture, the polymerisation takes place under the conditions of solution polymerisation and a viscous, aqueous or aqueous/alkanolic solution of the copolymer according to the invention is obtained, from which the product can be isolated by removing the solvent by distillation or by precipitating the product by mixing the solution with a water-miscible organic solvent, such as methanol, ethanol, acetone or the like.

Preferably, however, the resulting aqueous or aqueous/alkanolic solution is taken without further treatment, if necessary after adjusting the concentration to a desired level, for the intended use.

If the copolymerisation is carried out in a water-miscible organic solvent, the reaction proceeds under the conditions of precipitation polymerisation. In this case the polymer is obtained directly in a solid form and can be isolated by removing the solvent by distillation or by filtering off the product with suction and drying it.

Possible water-miscible organic solvents suitable for carrying out the preparative process according to the invention are, in particular, water-soluble alkanols, namely those having 1 to 4 C atoms, such as methanol, ethanol, propanol, isopropanol or n-, sec.- and iso-butanol, but preferably tert.-butanol.

The water content of the lower alkanols employed as the solvent in this reaction should not exceed 6% by weight, since otherwise lumps can be formed in the polymerisation. It is preferable to carry out the reaction at a water content of 0–3% by weight.

The amount of solvent to be employed depends to a certain extent on the nature of the comonomers employed.

As a rule, 200 to 1,000 g of solvent are employed per 100 g of total monomers.

If the polymerisation is carried out in an inverted emulsion, the aqueous solution of monomers is emulsified in a known manner in a water-immiscible organic solvent, such as cyclohexane, toluene, xylene, heptane or high-boiling petroleum ether fractions by adding 0.5–8% by weight, preferably 1–4% by weight, of known emulsifiers of the W/O type, and polymerisation is carried out by means of customary, free-radical forming initiators.

The principle of inverted emulsion polymerisation is known from U.S. Pat. No. 3,284,393. In this process, water-soluble monomers or mixtures thereof are polymerised under hot conditions to give high-molecular copolymers by first emulsifying the monomers or aqueous solutions thereof, with the addition of water-in-oil emulsifiers, in a water-immiscible organic solvent which forms the continuous phase, and warming this emulsion in the presence of free-radical initiators. The comonomers to be employed can be emulsified as such in the water-immiscible organic solvent, or they can be employed in the form of an aqueous solution containing between 100 and 5% by weight of comonomers and 0 to 95% by weight of water, the composition of the aqueous solution being a matter of the solubility of the comonomers in water and the polymerisation temperature envisaged. The ratio between the water and the monomer phase can be varied within wide limits and is, as a rule, 70:30 to 30:70.

0.1 to 10% by weight, relative to the oil phase, of a water-in-oil emulsifier are added to the mixtures in order to emulsify the monomer phase in the water-immiscible organic solvent to form a water-in-oil emulsion. It is preferable to use emulsifiers which have a relatively low HLB value. The oil phase employed can, in principle, be any inert water-insoluble liquid, that is to say in principle any hydrophobic organic solvent. Within the scope of the present invention, hydrocarbons having a boiling point within the range from 120° to 350° C. are generally used. These hydrocarbons can be saturated, linear or branched paraffin hydrocarbons, such as are mainly present in petroleum fractions, and these hydrocarbons can also contain the customary proportions of naphthene hydrocarbons. However, it is also possible to employ, as the oil phase, aromatic hydrocarbons, such as, for example, toluene or xylene, and also mixtures of the hydrocarbons mentioned above. It is preferable to use a mixture of saturated normal and isoparaffin hydrocarbons containing up to 20% by weight of naphthenes.

A detailed description of the process is to be found, for example, in German Patent Specification No. 1,089,173 (corresponding to U.S. Pat. No. 4,289,312) and in U.S. Pat. Nos. 3,284,393 and 3,624,019.

Copolymers having a particularly high degree of polymerisation are obtained if the polymerisation is carried out in aqueous solution by the process of so-called gel polymerisation. In this process 15-60% strength aqueous solutions of the comonomers are polymerised using known suitable catalyst systems without mechanical mixing, by making use of the Trommsdorff-Norrish effect (Bios Final Rep. 363,22; Makromol. Chem. 1, 169 (1947). Taking as a basis the customary model assumptions concerning the relationship of viscosity and average molecular weight of polymeric substances, and taking into consideration comparison values of polymers having a similar structure, average molecular weights having an order of magnitude of $10^6$ can be estimated for the products according to the invention from the viscosities of aqueous solutions of the water-soluble copolymers, according to the invention, which have been prepared in this manner and which are to be employed in accordance with the invention.

The polymerisation reaction is carried out within the temperature range between $-20°$ and 150° C., preferably between 5° and 90° C., and can be carried out either under normal pressure or under elevated pressure. As a rule, the polymerisation is carried out in an atmosphere of a protective gas, preferably under nitrogen.

The polymerisation can be initiated by means of high-energy electromagnetic radiation or by the customary chemical polymerisation initiators, for example organic peroxides, such as benzoyl peroxides, tert.-butyl hydroperoxide, methylethylketone peroxide or cumine hydroperoxide, azo compounds, such as azodiisobutyronitrile or 2'-azo-bis-(2-amidinopropane) dihydrochloride

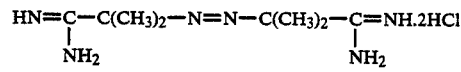

and inorganic peroxy compounds, such as $(NH_4)_2S_2O_8$ or $K_2S_2O_8$ or $H_2O_2$, if appropriate in combination with reducing agents, such as sodium bisulphite and iron-II sulphate, or redox systems containing, as the reducing component, an aliphatic or aromatic sulphinic acid, such as benzenesulphinic acid and toluenesulphinic acid, or derivatives of these acids, such as, for example, Mannich adducts formed from a sulphinic acid, aldehydes and amino compounds, such as are described in German Patent Specification No. 1,301,566 (corresp. to GB No. 1,147,852). As a rule, 0.03 to 2 g of the polymerisation initiator are employed per 100 g of total monomers.

The quality properties of the polymers can be improved even further by subsequently heating, for several hours within the temperature range of 50°-130° C., preferably 70°-100° C., the polymer gels obtained by the process of gel polymerisation.

The copolymers according to the invention which have been prepared by this route and are present in the form of aqueous gels can be dissolved in water without further treatment and used after mechanical comminution by means of suitable equipment. However, it is also possible to obtain them in a solid form by suitable drying processes after the removal of the water and not to redissolve them in water until they are used.

The new copolymers according to the invention are advantageously suitable as dyeing auxiliaries, in particular for dyeing cellulose-containing fibre materials by the pad cold-batch process. The effect of adding the copolymers according to the invention is substantially to increase the liquor pick-up of the cellulose-containing textile material to be dyed, which results in better dyeing in depth, even in the case of voluminous textile sheet-like structures, such as, for example, knitted goods. This results in dyeings of good evenness and excellent appearance.

Dyeings of good evenness and depth of colour are obtained when the new copolymers according to the invention are employed in pigment dyeing.

When added to padding liquors containing disperse dyestuffs, such as are used for dyeing polyester materials, the new copolymers according to the invention produce, independently of the pH value of the liquors, an excellent evenness and brilliance in the dyeings thus prepared.

Furthermore, copolymers according to the invention having molecular weights less than 50,000 (corresp. to K-values less than 45) are suitable in an advantageous manner for use as a so-called re-tanning substance, particularly for chrome leather.

The copolymer products of the invention are also suited for use as auxiliaries in the oilfield sector for secondary and tertiary recovery of oil and gas.

The following illustrative embodiments demonstrate the preparation of polymers according to the invention. All the % data relate to quantities by weight.

The abbreviations used in the illustrative embodiments and the tabular examples have the following meanings:

AM: acrylamide
VIMA: N-vinyl-N-methylacetamide
VIPY: N-vinylpyrrolidone
AIBA: 2-acrylamido-2-methylpropanesulfonic acid
VA: vinylacetamide
VIFA: vinylformamide
VSA-Na: sodium vinylsulfonate
Styrene SA: styrene-sulfonic acid
VPA: vinylphosphonic acid
VPM: methyl vinylphosphonate
AA: acrylic acid
MAA: methacrylic acid The molecular weight of the copolymers can be calculated on the basis of viscosity data using the customary model conceptions of the correlation between the viscosities of polymer substances and their mean molecular weight and considering comparative values of similarly structured polymers.

The viscosity data taken as a basis for these calculations were obtained in a 0.05% by weight solution of the copolymers in 20% by weight hydrochloric acid at 20° C. using a Brookfield viscosimeter at a shearing rate of 7.5 sec$^{-1}$.

EXAMPLE 1

(Emulsion polymerisation)

7.2 g of ®Arkopal N 100 (a nonionic emulsifier based on an oxethylated phenol derivative) and 19.4 g of ®Span 80 (a nonionic emulsifier based on a sugar alcohol stearate) are dissolved in ®Isopar M (a technical mixture of isoparaffins having a boiling point of approx. 200°-240° C.) and the resulting solution is charged to a 1-liter reaction vessel equipped with a stirrer, a thermometer and a nitrogen inlet. A monomer solution is then prepared by dissolving 97.2 g of acrylamide, 9.7 g of AIBA and 1.1 g of methyl vinylphosphonate (VPM) in 105 ml of water. The pH value of the monomer solution is adjusted to 8.5 with 25% strength ammonia. The aqueous monomer solution is added to the organic phase while stirring rapidly. The reaction vessel is evacuated and then filled with nitrogen. A solution of 0.0275 g of ammonium persulphate in 3 ml of water is then added to the mixture, and the polymerisation is thus started. The reaction lasts 1.5 hours; the reaction temperature is kept between 30° and 40° C. This results in a stable emulsion which can be inverted in water in a manner which is in itself known by using commercially available surface-active agents. The resulting polymer solution has a K-value of 148.9.

The acid groups of the resulting copolymer can be liberated by acidifying the aqueous solution to pH 2.

EXAMPLE 2

(Solution polymerisation)

70 g of AIBA are dissolved in 200 g of water in a polymerisation flask of 1 liter capacity, equipped with a flat-flange lid, a stirrer, a thermometer and a gas inlet tube, and are neutralised with 25% strength ammonia. 10 g of acrylamide and 10 g of VPM are then added. The pH value is adjusted to 8.5, and 10 g of N-vinyl-N-methylacetamide are added. The reaction mixture is heated to 60° C., while being stirred and while nitrogen is passed in. 1 g of an aqueous 10% strength solution of dibutylamine HCl and 0.1 g of ammonium persulphate are then also added. The reaction lasts about 30 minutes, and the temperature rises to 70° C. The reaction mixture becomes viscous. It is subjected to further heating for another 2 hours at 80° C., while being stirred. A clear, highly viscous solution is obtained. The K-value is 166.7.

A solution which can be employed directly as a padding auxiliary for disperse dyestuff padding liquors is obtained if the pH value of the highly viscous polymer solution prepared is brought to neutrality by adding hydrochloric acid to pH 7 and is then adjusted to 4.5 with 30% strength acetic acid.

EXAMPLE 3

(Gel polymerisation)

A monomer solution is prepared by dissolving 60 g of acrylamide, 30 g of AIBA and 10 g of VPM in 250 g of water in a polymerisation flask of 1 liter capacity, equipped with a flat-flange lid, a stirrer, a thermometer and a gas inlet tube. The pH value is adjusted to 8.5 with 25% strength ammonia. 1 g of an aqueous 10% strength solution of dibutylamine HCl and 0.1 g of ammonium persulphate are now added while stirring and passing in ammonia. The mixture is stirred for a further 3 minutes at an increased speed while nitrogen is passed in. The introduction of nitrogen is terminated, and the inlet tube and the stirrer are lifted out of the mixture. The polymerisation sets in after an induction time of 30 minutes, the temperature rising from 20° C. to 78° C. and the solution changing into a gel of stable shape. The K-value is 218.8.

EXAMPLE 4

(Precipitation polymerisation)

49.7 g of acrylamide, 7.1 g of AIBA, 10.7 g of VPM and 3.6 g of methacrylic acid (MAA) are dissolved in 440 ml of tert.-butanol in a polymerisation flask of 1 liter capacity equipped with a stirrer, a reflux condenser, a thermometer, a dropping funnel and a gas inlet tube. The monomer solution is heated to 50° C. while being stirred and while nitrogen is passed in, and 1 g of azoisobutyronitrile, dissolved in 5 ml of DMF, is added dropwise. The polymerisation sets in after an induction time of 30 minutes; the reaction temperature rises to 68° C. and the polymer is precipitated. The mixture is subsequently heated for a further 2 hours at 80° C. The copolymer can be isolated by filtration with suction and drying. However, it is also possible to remove the solvent directly by distillation under reduced pressure. The polymer is obtained in the form of a white, lightweight powder which dissolves readily in water and has a K-value of 115.0.

The copolymers of the following table can also be prepared in accordance with these four procedures.

TABLE

| No. | % AM | % AIBA | % VPA | % VPM | % AA | % MAA | % VIFA | % VIMA | % VIPY | % VSA-Na | % Styrene SA | % VA | K Value |
|---|---|---|---|---|---|---|---|---|---|---|---|---|---|
| 1 | 5 | 15 |  | 80 |  |  |  |  |  |  |  |  | 16.5 |
| 2 | 5 | 15 | 5 | 75 |  |  |  |  |  |  |  |  | 14.4 |
| 3 | 5 |  | 10 | 65 |  |  |  | 11 |  |  | 9 |  | 11.1 |
| 4 | 20 | 10 |  | 40 |  | 20 |  |  |  | 10 |  |  | 64.4 |
| 5 | 50 | 15 |  | 5 | 5 |  |  |  | 25 |  |  |  | 70.3 |
| 6 | 80 | 15 |  | 5 |  |  |  |  |  |  |  |  | 148.9 |
| 7 | 85 | 10 | 2 | 3 |  |  |  |  |  |  |  |  | 143.3 |
| 8 | 75 | 12 |  | 10 |  |  |  |  |  |  | 3 |  | 159.3 |
| 9 | 70 | 5 |  | 15 | 5 |  |  |  |  | 5 |  |  | 115.0 |
| 10 | 70 | 20 | 5 | 5 |  | 5 |  |  |  |  |  |  | 143.0 |
| 11 | 60 | 20 |  | 15 |  |  | 5 |  |  |  |  |  | 29.3 |
| 12 | 65 | 10 | 10 | 10 |  |  |  |  |  |  |  | 5 | 113.2 |
| 13 | 10 | 80 |  | 10 |  |  |  |  |  |  |  |  | 212.8 |
| 14 | 10 | 60 |  | 10 |  |  |  | 10 |  |  |  | 10 | 160.0 |
| 15 | 30 | 50 |  | 10 |  |  |  |  | 10 |  |  |  | 194.8 |
| 16 | 40 | 40 | 5 | 10 |  |  | 5 |  |  |  |  |  | 218.8 |
| 17 | 50 | 30 | 5 | 5 | 5 | 5 |  |  |  |  |  |  | 108.6 |
| 18 | 50 | 9 | 5 | 11 | 15 | 5 |  |  |  | 5 |  |  | 58.4 |
| 19 | 45 |  | 5 | 40 |  |  |  |  |  | .8 | 2 |  | 76.8 |
| 20 | 45 | 10 | 5 | 15 |  |  |  | 20 |  | 5 |  |  | 120.4 |
| 21 | 25 |  |  | 5 |  |  |  |  |  | 70 |  |  | 61.3 |
| 22 | 5 | 9 |  | 86 |  |  |  |  |  |  |  |  | 10.7 |
| 23 | 50 | 9 | 30 | 11 |  |  |  |  |  |  |  |  | 67.6 |
| 24 | 40 | 19 |  | 11 |  |  |  | 30 |  |  |  |  | 148.3 |
| 25 | 50 | 10 |  | 10 | 30 |  |  |  |  |  |  |  | 136.4 |
| 26 | 50 |  | 15 | 20 | 15 |  |  |  |  |  |  |  | 98.5 |
| 27 | 30 | 15 |  | 10 |  |  | 10 | 10 | 10 | 15 |  |  | 47.4 |
| 28 | 25 | 20 | 10 | 25 |  |  | 10 |  |  |  |  | 10 | 112.2 |
| 29 | 30 | 20 |  | 20 |  |  | 5 |  |  |  |  | 25 | 132.2 |
| 30 | 70 |  |  | 30 |  |  |  |  |  |  |  |  | 164.0 |
| 31 | 50 | 30 | 10 | 10 |  |  |  |  |  |  |  |  | 137.0 |
| 32 | 60 | 30 |  | 10 |  |  |  |  |  |  |  |  | 148.0 |

EXAMPLE 5

(a) A mixed fabric of polyester fibres and viscose staple fibres mixed in the ratio of 70:30 is padded, the liquor pick-up being 60% relative to dry weight, with a liquor which contains, per liter of water, 50 g of the disperse dyestuff C.I. Disperse Orange 13 in its commercial form and nature, and 15 ml of a 4% strength solution of a copolymer of the composition according to tabulated Example 7, prepared according to Example 2, the liquor having been adjusted to a pH value of 5.5 with 20% strength acetic acid.

The fabric padded in this way is dried at a temperature of 130° C. and is then thermosol-treated for 60 seconds at a temperature of 210° C.

The dyeing is then after-treated by soaping at the boil. An orange dyeing of maximum brilliancy and excellent levelness is thus obtained on the polyester constituent of the fabric.

(b) The copolymer of the invention used in para. (a) above was prepared as follows:

10 g of AIBA and 2 g of VPA are dissolved in 200 g of water in a polymerisation flask of 1 liter capacity, equipped with a flat-flange lid, a stirrer, a thermometer and a gas inlet tube, and are neutralised with 25% strength ammonia. 85 g of acrylamide and 3 g of VPM are then added. The pH value is adjusted to 8.5, and the reaction mixture is heated to 60° C., while being stirred and while nitrogen is passed in. 1 g of an aqueous 10% strength solution of dibutylamine HCl and 0.1 g of ammonium persulphate are then also added. The reaction lasts about 30 minutes, and the temperature rises to 70° C. The reaction mixture becomes viscous. It is subjected to further heating for another 2 hours at 80° C., while being stirred. A clear, highly viscous solution is obtained. The K-value is 166.7.

A solution which can be employed directly as a padding auxiliary for disperse dyestuff padding liquors is obtained if the pH value of the highly viscous polymer solution prepared is brought to neutrality by adding hydrochloric acid to pH 7 and is then adjusted to 4.5 with 30% strength acetic acid.

EXAMPLE 6

A cotton terry towelling is padded with a dye liquor which contains, per liter, 40 g of the commercial dyestuff ®Remazol yellow FG, 30 g of sodium sulphate, 20 g of sodium hydroxide solution (32.5% strength) and 20 ml of a 4% strength solution of the copolymer prepared according to Example 5b.

The padded material is squeezed to a liquor pick-up of 90% and is rolled up. The goods are allowed to stand for 20 hours with slow turning of the roll. Subsequently, the dyed material is saponified in the customary manner, is given a hot and cold rinse and is dried. A full, brilliant yellow dyeing with excellent levelness and penetration of the dye is obtained.

In a manner analogous to with Examples 5 and 6 other copolymers of Examples 1 to 4 and the tables can be employed to enhance the levelness and dye penetration of textile dyeings.

EXAMPLE 7

(a) 100 parts of a chrome-tanned calf leather neutralised in a customary manner, are after-treated for 90 minutes and at 30° C. with a solution of 200 parts of water and 5 parts, relative to dry substance, of the polymer of tabulated Example 8, prepared in analogy with Example 4.

After a short rinse the after-treated leather is greased in a customary manner with 4 to 6 parts of a light-fast greasing agent based on sulphonated sperm oil and is subsequently dried.

A leather of a bright color, with excellent fastness to light, a soft, full feel and a fine grain is obtained.

(b) The copolymer used in para. (a) above is prepared as follows:

52.8 g of acrylamide, 8.5 g of AIBA, 7.1 g of VPM and 2.1 g of styrenesulfonic acid (styrene-SA) are dissolved in 440 ml of tert.-butanol in a polymerisation flask of 1 liter capacity equipped with a stirrer, a reflux condenser, a thermometer, a dropping funnel and a gas inlet tube. The monomer solution is heated to 50° C. while being stirred and while nitrogen is passed in, and 1 g of azoisobutyronitrile, dissolved in 5 ml of DMF, is added dropwise. The polymerisation sets in after an induction time of 30 minutes; the reaction temperature rises to 68° C. and the polymer is precipitated. The mixture is subsequently heated for a further 2 hours at 80° C. The copolymer can be isolated by filtration with suction and drying. However, it is also possible to remove the solvent directly by distillation under reduced pressure. The polymer is obtained in the form of a white, light-weight powder which dissolves readily in water and has a K-value of 45.

EXAMPLE 8

(a) 200 parts of water are added to 100 parts of chrome-tanned sheep leather at 40° C. Thereafter, 10 parts, relative to dry substance, of a polymer according to tabulated Example 2 and prepared in analogy with Example 1, are added to the liquor which is then allowed to act on the leather for 2 hours at 40° C. After a rinse the treated leather is greased with about 5 parts of a conventional greasing agent and is subsequently dried. A full, pliable leather with a close and hard grain is obtained.

(b) 7.2 g of ®Arkopal N 100 (a nonionic emulsifier based on an oxethylated phenol derivative) and 19.4 g of ®Span 80 (a nonionic emulsifier based on a sugar alcohol stearate) are dissolved in ®Isopar M (a technical mixture of isoparaffins having a boiling point of approx. 200°-240° C.) and the resulting solution is charged to a 1-liter reaction vessel equipped with a stirrer, a thermometer and a nitrogen inlet. A monomer solution is then prepared by dissolving 5.4 g of acrylamide, 16.2 g of AIBA, 5.4 g of VPA and 81 g of methyl vinylphosphonate (VPM) in 105 ml of water. The pH value of the monomer solution is adjusted to 8.5 with 25% strength ammonia. The aqueous manner solution is added to the organic phase while stirring rapidly. The reaction vessel is evacuated and then filled with nitrogen. A solution of 0.0275 g of ammonium persulphate in 3 ml of water is then added to the mixture, and the polymerisation is stus stated. The reaction lasts 1.5 hours; the reaction temperature is kept between 30° and 40° C. This results in a stable emulsion which can be inverted in water in a manner which is in itself known by using commercially available surface-active agents. The resulting polymer solution has a K-value of 14.4.

What is claimed is:

1. Water-soluble copolymers containing a statistical distribution of 1–86% by weight of structural units of the formula

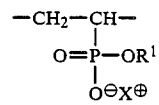

9–80% by weight of units of the formula

5–90% by weight of units of the formula

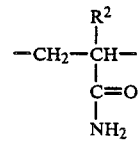

and up to a total of 30% by weight of one or more units of the formulae

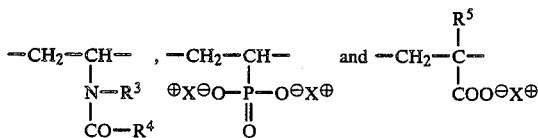

wherein
$R^1$ is alkyl having 1 to 4 carbon atoms;
$R^2$ and $R^5$ independently of one another are each hydrogen or methyl;
$R^3$ and $R^4$ independently of one another are each hydrogen, methyl or ethyl, or together $R^3$ and $R^4$ are trimethylene or pentamethylene; and
$X^\oplus$ is $H^\oplus$ or a cation.

2. A water-soluble copolymers according to claim 1, having a statistical distribution of 1–10% by weight of units of the formula

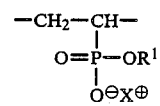

10–70% by weight of units of the formula

29–80% by weight of units of the formula

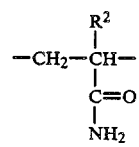

and up to 20% by weight of one or more units of the formulae

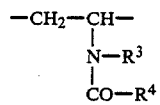
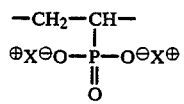
-continued
and
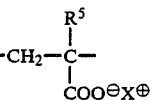
3. Water-soluble copolymers according to claim 1 wherein $X^\oplus$ is an alkaline earth metal cation, an alkali metal cation, an ammonium ion or a cation of lower aliphatic amines.
* * * * *